United States Patent Office 3,621,752
Patented Nov. 23, 1971

3,621,752
APPARATUS FOR TRIMMING SPECIMEN
BLOCKS FOR MICROTOMY
Hellmuth Sitte, Homburg (Saar), Germany, assignor to
C. Reichert Optische Werke A.G., Vienna, Austria
Filed Aug. 14, 1969, Ser. No. 850,137
Claims priority, application Austria, Aug. 30, 1968,
A 8,470/68
Int. Cl. B23c 3/00
U.S. Cl. 90—11 R                              2 Claims

ABSTRACT OF THE DISCLOSURE

A milling apparatus in which the cutter is movable axially and transversely and the work piece is rotatable about infinitely variable axes.

BACKGROUND OF THE INVENTION

This invention relates to a specific arrangement for trimming specimens for work on the microtome, preferably ultramicrotome. The arrangement should enable a quick and accurate trimming of the specimen blocks so that the results are highly independent of the skill of the operator.

It is an increasing practice in the art to embed specimens for light-optical or electron-optical examination in plastics materials as the same are polymerized and then to cut the specimens on a microtome, preferably an ultramicrotome. The matrix material consists in most cases of an epoxide or polyester, which is relatively hard so that it is difficult to trim the block with normal knife blades of metal, glass or diamond before the specimen is prepared for mounting. In such trimming operations, relatively large amounts of plastics material and/or specimen material must be removed. This remark will be particularly applicable if the specimen itself has a relatively high hardness or toughness, such as is the case with bones, cartilage, tendons, wood, minerals or metals. Particularly the last-mentioned specimens must be exactly trimmed before the specimen is cut into sections.

DRAWING

Figure 1:
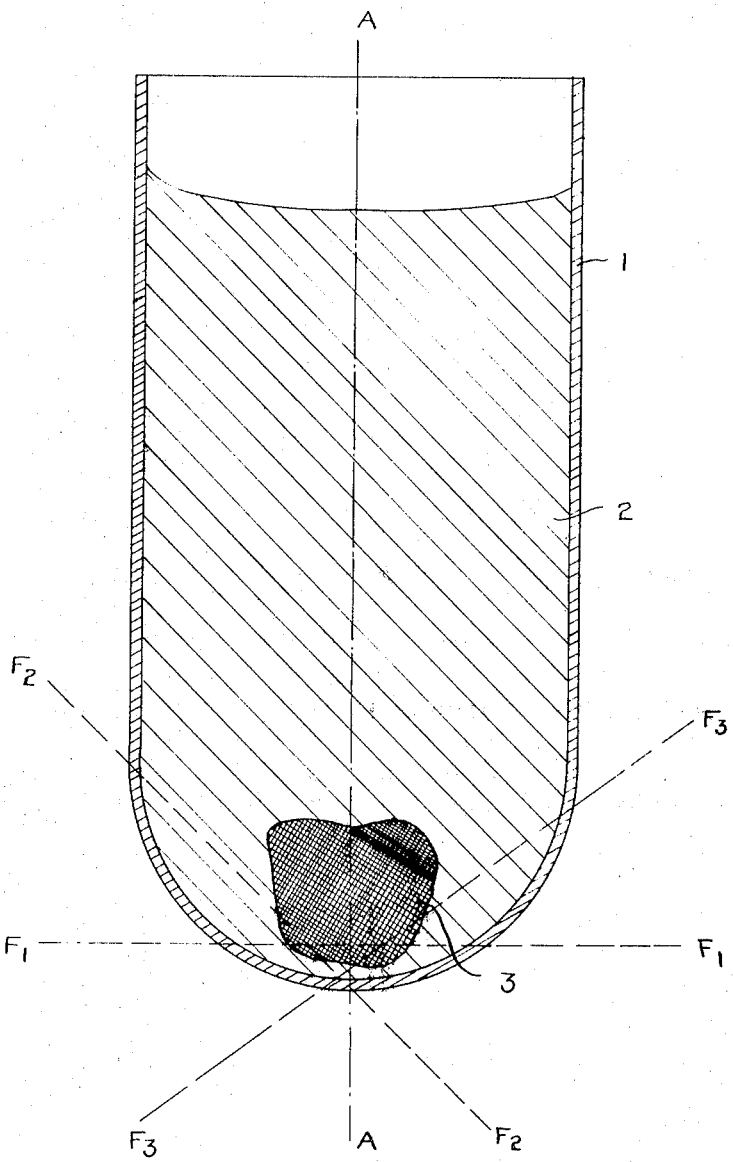
FIG. 1 is a sectional view of a container with specimen.

The specimen is generaly prepared for the cutting operation in that it is impregnated with the liquid monomer of a plastics material and when completely impregnated is transferred into a container of gelatine or plastics material. A container which is often used is shown in FIG. 1 of the accompanying drawing and consists of a cylindrical capsule 1 of gelatine, which is about 5 millimeters in diameter and has a hemispherical botom. This gelatine capsule is filled with plastics material 2, which is initialiy in a liquid, monomeric state. The specimen 3, which has been impregnated as fully as possible with the plastics material monomer, is placed into the plastics material 2 and subsides to the bottom of the capsule. When the specimen has ben introduced, the plastics material monomer is polymerized so that the specimen is encased in plastics material. For the preparation of sections on the microtome, preferably ultramicrotome, it is necessary or desirable in most cases to produce a planar first surface of cut. This surface is, e.g., at right angles to the axis A—A of the block, and is symbolized in FIG. 1 by the doted line $F_1$—$F_1$. The surface should be perfectly planar so that it is not necesary to remove additional material on the microtome or ultramicrotome. The first surface of cut $F_1$—$F_1$ consists in part of a surface of cut of the specimen 3 and in part of plastics material 2 which is free of the specimen. This free plastics material must be removed in most cases in further operations to form additional surfaces which are indicated in FIG. 1 by the doted lines $F_2$—$F_2$ and $F_3$—$F_3$ so that the end of the block has the shape, e.g., of a truncated pyramid.

Instead of the gelatine capsule shown in FIG. 1, various containers may be used to embed specimens. In all cases, however, a trimming operation is required which may be different from the method described with reference to the gelatine capsule but is generally similar thereto.

Figure 2:
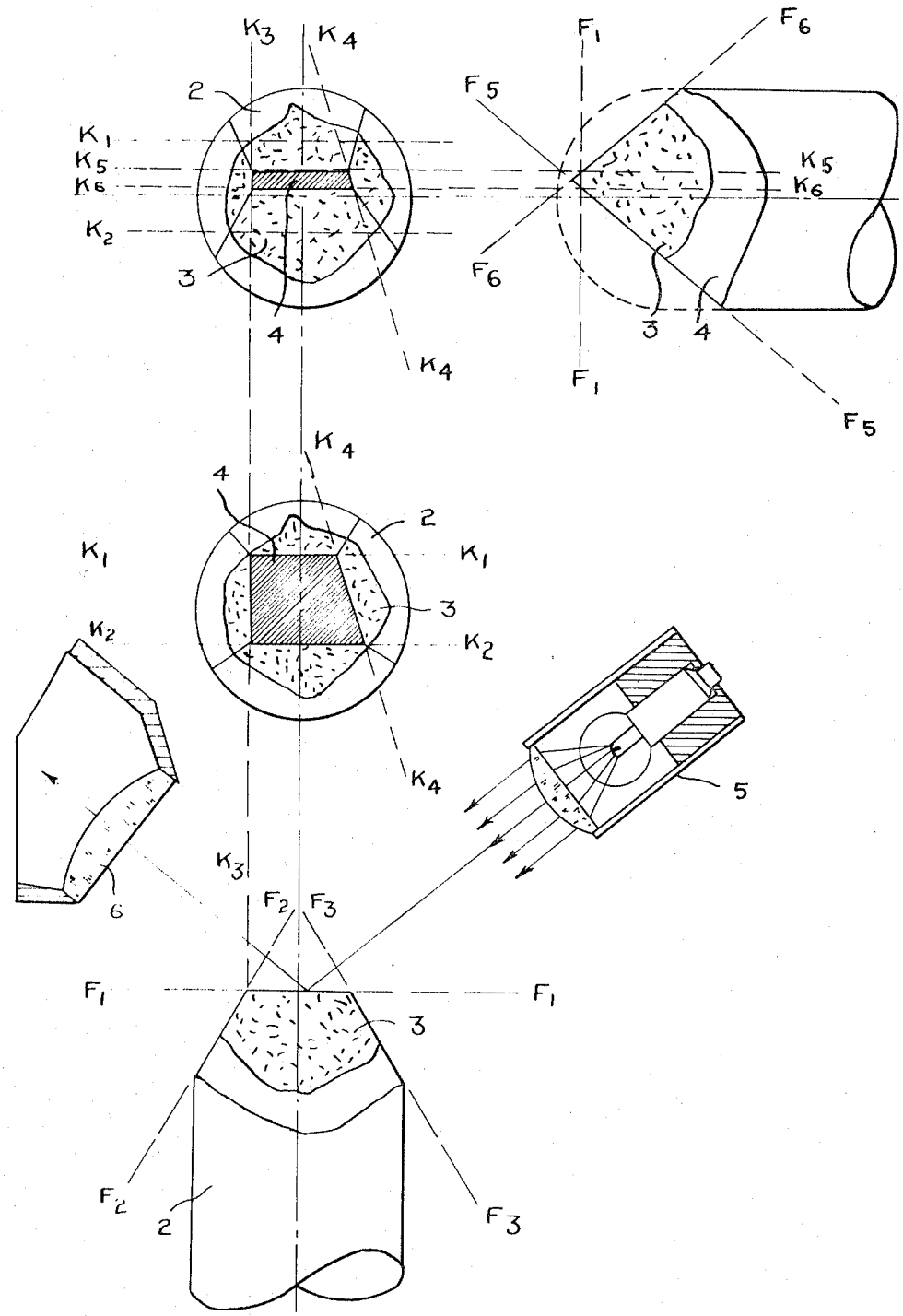
FIG. 2 shows various faces of the embedded specimen as trimmed.

The steps of the trimming operation will now be exactly explained with reference to FIG. 2, which is a side elevation showing a specimen block in two phases of the trimming operation and a top plan view showing the "pyramid". With reference to the lower half of FIG. 2, the first surface of cut $F_1$—$F_1$ and thereafter the pyramid surfaces $F_2$—$F_2$, $F_3$—$F_3$ are formed. The specimen is then cut on the microtome or ultramicrotome. This practice will normally be sufficient. The two edges $K_1$—$K_1$ and $K_2$—$K_2$ of the first surface of cut must be exactly parallel. As the block is cut into sections, these edges are at right angles to the direction of movement of the specimen and parallel to the knife edge. If they are parallel, properly coherent, straight ribbon-like sections will be obtained, such as are particularly required in ultramicrotomy. On the other hand, the lateral edges $K_3$—$K_3$ and $K_4$—$K_4$ are normally not parallel. The resulting asymmetry of the surface of cut permits of a good orientation in the microscopic or electron-optical image. In the preparation of series of sections for electron microscopy, it is necessary in most cases to re-trim the specimen block. This second operation is generally performed with reference to the sections which have been made previously and have been examined if, e.g., an interesting structure has been found in the specimen 3. This structure 4 can often be detected in the first surface of cut $F_1$—$F_1$ if a light source 5 is so adjusted that a bundle of parallel rays are reflected by the first surface of cut into the lens 6 of a suitable optical system (microscope, stereo microscope). A slight relief may be formed in the first surface of cut when the plastics material is pressed in a plastic state as it is cut. This relief enables a check of the second trimming operation, in which the surfaces $F_5$—$F_5$ and $F_6$—$F_6$ are formed. The new edges $K_5$—$K_5$ and $K_6$—$K_6$ must be parallel because the distance between them is in most cases much smaller than 0.5 millimeter. In view of these facts and the generally method requirements, any apparatus for cutting specimen blocks must meet the following requirements:

The apparatus must enable a removal of hard material in substantial amounts, normally about 5–500 cubic millimeters per block, without a substantial wear of the knife edge. This operation must result in a planar first surface of cut. Two edges of that first surface of cut must be parallel and straight-lined. It must be possible to adapt the two other edges to any other orientation which may be required so that the first surface of cut may have an asymmetrical shape to enable an orientation during the examination and a removal even of specimen portions which can be cut only with difficulty. It must be possible to supervise the entire preparation with a suitable viewing device, which comprises in most cases a light source and an optical system having a sufficiently high magnification.

None of the previously disclosed trimming apparatus meets all requirements listed above. In the simplest method known in the art, the specimen block is trimmed on the ultramicrotome itself or on a suitably arranged stereo microscope with a razor blade or another metal blade, such as a microtome knife. This operation is supervised with a microscope. In this operation, which is carried out with microscopic observation, it is not possible in most cases to obtain a first surface of cut which is sufficiently planar and has two edges which are sufficiently parallel. This disadvantage may be eliminated by the additional use of various mechanical guides for the metal blade. On the other hand, it is not possible in this operation to prevent a rapid formation of indentations in metal blades used to trim hard plastics materials or hard specimens so that the removal of the above-mentioned amounts of material from the specimen block is still a laborious and time-consuming operation. This remark is even more applicable to the use of glass knives to trim specimen blocks on the ultramicrotome itself. More recently an arrangement has been disclosed in which a lathe or a striking tooth is used to trim the object. These means enable a trimming of a plurality of blocks with one cutting tool but this involves the disadvantage that the use of a stationary knife with a rotating object, e.g., in a lathe, renders an optical supervision difficult or even impossible whereas a striking tooth can be operated only with difficulty by unskilled persons and involves a certain risk of accident. Finally, material has been removed by commercially available grinders used in dentistry but these are too expensive for the present purpose and in most cases do not produce smooth, flat surfaces on the matrix materials.

It is an object of the invention to facilitate the trimming of hard specimen blocks for microtomy, preferably ultramicrotomy, in that a suitable machining tool is employed, all adjustments required for the trimming operation are minimized and the trimming operation itself can be performed with visual supervision enabled by a suitable illumination and with the required precision as to the planetary of the surfaces which are produced and the parallelism of the resulting edges.

The invention essentially teaches to provide an apparatus for trimming the specimen blocks in which all axes about which the specimen block can be swung as well as the path of the machining tool used to trim the block and the optical axes of the supervising and illuminating systems intersect in the top portion of the specimen block, which top portion protrudes from the specimen holder.

Hence, the apparatus according to the invention for trimming specimen blocks for microtomy, preferably ultramicrotomy, is characterized in that the specimen block is arranged to be rotatable about at least two axes, which are at right angles to each other, full complete revolutions can be performed about at least one axis, which is non-stationary, all axes of rotation intersect within that portion of the specimen block which protrudes from the holder, and the specimen block has associated with it a cutting tool having one or more cutting edges for a trimming machining operation whereby planar surfaces may be produced on the specimen block which extend parallel to and at a very small distance from the single stationary axis of rotation, which is predetermined by the position of the base of the apparatus.

In the use of the apparatus according to the invention, means are employed for imparting pivotal and rotational movements to the apparatus so that the necessary adjustments are minimized. This is a special advantage over all previously known systems and enables a very fast and precise operation.

The design for the system according to the invention is much simplified and its performance is much improved in that commercially available slot-milling cutters are used as machining tools for the trimming operation and the milling cutter may be used for end milling or slot-milling operations if it has been properly ground and its cutting edges have a proper configuration. A compound rest is suitably employed to set the tool close to the specimen. A further advantage may be afforded by the use of a hard alloy milling cutter, particularly when the specimens or matrix materials to be trimmed are very hard.

In an embodiment of the apparatus according to the invention, the motor for driving the milling tool is energized and de-energized by a switch which is directly or indirectly operated by the movement of the milling tool during the trimming operation so that there is no need for a separate control operation.

In a development of the invention, one or more of the mechanical elements used in the feeding or rotating operations are provided with scales which enables a reproduction of a specific setting or a direct reading of degrees of angles or units of length.

The apparatus according to the invention may be designed to that a lever rather than a crank handle and screw is provided for a fast setting of the milling tool. Ensuring an adequate precision, this lever enables a very fast return of the tool to its position of rest so that the time required for the trimming operation is much reduced.

A feature which is important for the practice of the apparatus which has been described resides in the provision of an optical magnifying system which facilitates the supervision of the trimming of the specimen block and which has an optical axis that intersects the axes of rotation of the specimen block in that portion of the specimen block which freely protrudes from the specimen holder. There may be an additional light source, which has an optical axis which also intersects the remaining axes at the point defined above, at least if the focusing is satisfactory. This light source and a converging lens arranged before the same are preferably disposed so that a reflected image of the surface of cut of the specimen block can be supervised as its lateral boundaries are formed or corrected.

In a particularly desirable embodiment of the invention, specimen holders of various types of ultramicroscope may be directly inserted into the arrangement with the aid of simple adapters, which compensate the differences in design between the specimen holders, so that one and the same basic instrument may be used without an alteration for a trimming of successive blocks which are mounted in different types of specimen holders. This embodiment has been provided in view of the fact that different types of ultramicrotomes are often used in one laboratory and it may be required that the specimens should remain in one and the same specimen holder throughout the sequence of operations.

DESCRIPTION

Figure 3:
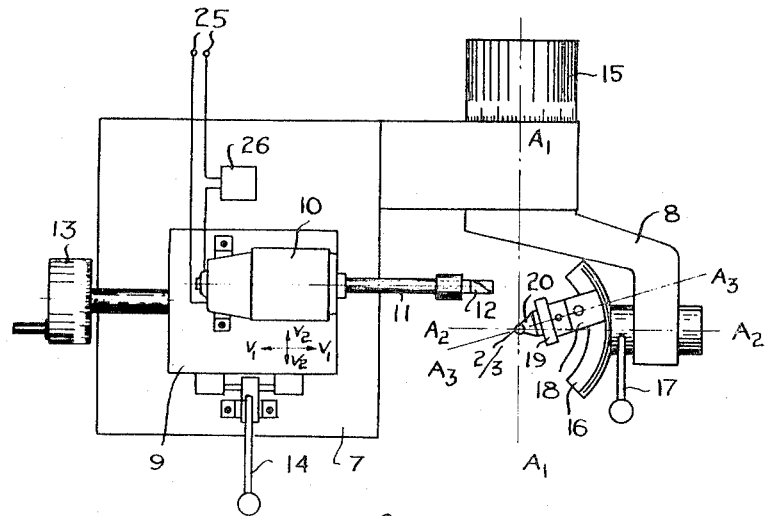
FIG. 3 is a top view of a specimen trimming apparatus according to this invention.
Figure 4:
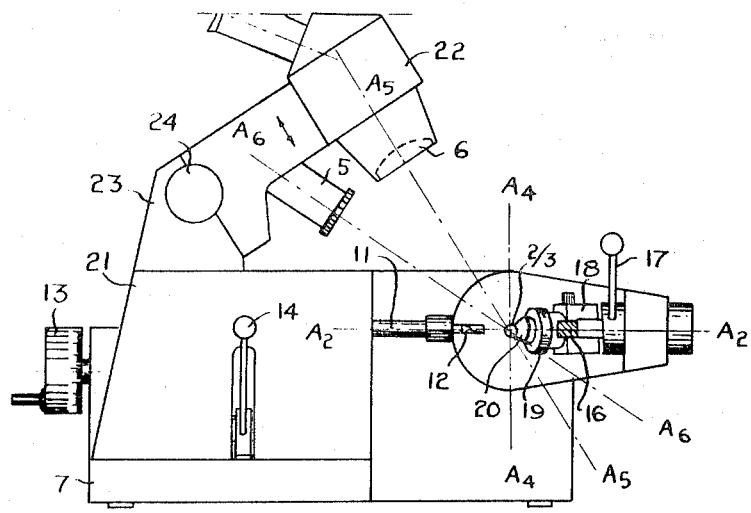
FIG. 4 is a side view of the apparatus shown in FIG. 3.
Figure 5:
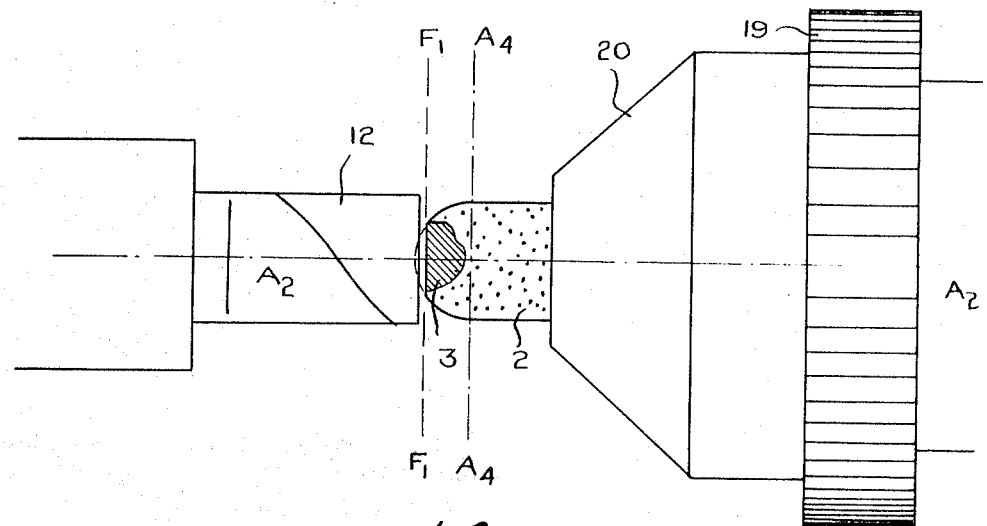
FIGS. 5 and 6 are enlarged views showing the specimen and trimming cutter in operative relationship.
Figure 6:
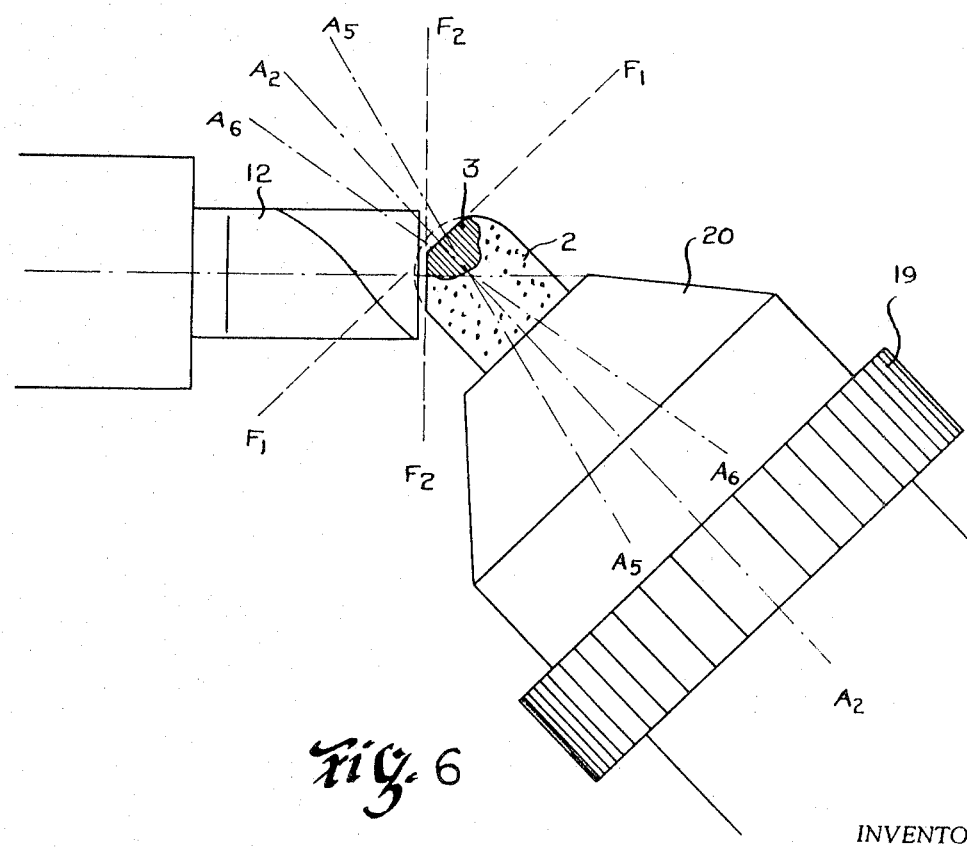

The system according to the invention and its basic mode of operation will be explained further with reference to an embodiment which is shown by way of example in FIGS. 3 to 6, of the drawing and to which the invention is not restricted. In the drawing, FIG. 3 is a top plan view showing an apparatus for trimming specimen blocks. FIG. 4 is a side elevation showing the same apparatus. FIGS. 5 and 6 are enlarged views showing the positions of the axes during the trimming of the first surface of cut or a pyramid surface.

In the top plan view shown in FIG. 3, the machining apparatus is apparent in an open condition without covering hod and optical system. A base 7 is directly or indirectly formed on one side with a bore for receiving a plain bearing for the pivotal movement of an arm 8 about a pivotal axis $A_1$—$A_1$. The arm 8 carries the specimen block 2, 3. The base 7 caarries also a compound rest 9, which mounts a drive motor 10 having a drive shaft 11, to which a machining tool consisting of a slot-milling cutter 12 is directly or indirectly secured. Suitable means may be provided to displace the compound rest 9 in the direction of the two parts. The movement $V_1$—$V_1$ serves to set the milling cutter 12 to the specimen block 2, 3 for an end milling operation. The movement $V_2$—$V_2$ serves for a slot-milling operation, which in most cases gives better results and can be supervised more easily. For this reason, the movement $V_1$—$V_1$ must be controlled most accurately, e.g., with the aid of a micrometer screw and a handwheel 13, which may be graduated. On the other hand, the transverse movement $V_2$—$V_2$ may be performed quickly with the aid of a lever 14. The supply circuit 25 for the motor 10 may be opened by a switch contact when the compound rest is in its zero position so that there is no need for separate operations to energize the motor 10 for the milling operation and to deenergize it when the milling operation has been completed. It is highly desirable to lock the lever 14 in its zero position by a suitable locking member, e.g., a latch, in order to minimize the risk of accidents as far as possible.

The pivoted arm 8 may be swung about the axis $A_1$—$A_1$ by means of a knurled knob 15. The knob 15 may be provided with a scale for an adjustment of relative magnitudes or degrees of angles. An arcuate segment 16 is secured to a spindle which is rotatably mounted to the pivoted arm 8 and substantially corresponds to those holders of ultramicrotomes which are centered on the object. The arcuate segment 16 may be pivotally moved about an axis $A_2$—$A_2$ with the aid of a lever 17. The combination of that lever with a latch mechanism, not shown, enables in known manner a pivotal movement of the arcuate segment in steps of exactly 90° during a full movement. The movement of the lever 17 need not be completed but may be interrupted when the lever has been swung through any desired angle. A brake is provided in the bearing for the arcuate segment 16 and sufficiently holds the same in any intermediate position. Just as parts 13 and 15, the arcuate segment may carry a scale representing relative magnitudes or degrees of angles. A pivoted element 18 may be fixed in different positions to the arcuate segment 16. The axis $A_3$—$A_3$ of the pivoted element 18 is approximately identical to the axis of the specimen block 2, 3. With the aid of a special device, not shown in detail, the specimen block can be adjusted by small amounts in the directions of the three space coordinates $x$, $y$, $z$. This adjustment serves to compensate eccentricities of the specimen and differences in the height of the specimen. The pivoted element 18 is pivotally moved in the arcuate segment 16 about an axis $A_4$—$A_4$ (see FIG. 4). The element 18 receives a speciment holder 20 directly or in cooperation with an adapter member 19, which enables a use of different specimen holders from different types of ultramicrotomes.

In the side elevation of FIG. 4, the same arrangement as in FIG. 3 is shown with the cover hood 21 in position and with a viewing device secured to the cover hood. In this case, a stereo microscope 22 is used for viewing and comprises a support 23, which is provided with a focusing mechanism 24, which in known manner is parallel to the optical axis $A_5$—$A_5$. If the illuminating system 5 is correctly focused, its optical axis $A_6$—$A_6$ will intersect the optical axis $A_5$—$A_5$ of the lens 6 exactly in the specimen block 2, 3.

It is clearly apparent from FIGS. 3 and 4 how the characteristic features of the invention can be realized: All axes $A_1$—$A_1$ to $A_6$—$A_6$ intersect in th specimen block 2, 3 and the movement of the machining tool 12 can be controlled by means of the handwheel 13 and the lever 14 to that point of intersection.

The practical use of the apparatus according to the invention is most simple. When the specimen block 2, 3 has been adjusted in the directions $x$, $y$, $z$ in the holder system 18, 19, 20 and the pivoted element 18 has been adjusted on the arcuate segment 16, the first surface of cut $F_1$—$F_1$ is provided first with the axis $A_2$—$A_2$ in a horizontal position. To move the axis $A_2$—$A_2$ to a horizontal position, the handle 15 is rotated and with it the arm 8 that is connected to it. By means of the wheel 13 and the lever 14, the compound rest is displaced so that the milling cutter 12 moves close to the specimen block 2, 3 and into the field of view of the stereo microscope 22. The drive motor 10 is automatically energized by the contact 26 when the lever 14 is swung from its zero position. When the milling operation has been performed, the milling cutter 12 is returned to its zero position and the motor 10 is automatically de-energized. The resulting positions of the axes are apparent from FIG. 5 and the positions reached during the subsequent formation of the pyramid surfaces are apparent from FIG. 6. The milling cutter 12 is now used to form the pyramid surfaces $F_2$—$F_2$ etc. in four successive operations. After each milling operation, the lever 17 is operated to impart to the specimen a pivotal movement through exactly 90° or a smaller angle, as may be required. The latching mechanism cooperating with the lever 17 ensures that the edges $K_1$—$K_1$ and $K_2$—$K_2$ or $K_5$—$K_5$ and $K_6$—$K_6$ of FIG. 2 are exactly parallel whereas the viewing through the magnifying glass is not interrupted because the pivotal movement need not be visually supervised. When the milling operations have been performed, the specimen may be transferred immediately to the ultramicrotome because it is left in the original specimen holder throughout the trimming operation.

The system according to the invention may be embodied in various forms, which involve the use of various known elements of construction or a simplification but do not depart from the essential features of the invention. For instance, the use of only part of the described elements appears quite desirable in view of the state of the art. Parts 5, 6, 26, 20, 22, 23, 24 and the scales may be omitted, as well as the lever 14 and the compound rest carried by the lever and used to perform the transverse movement $V_2$—$V_2$, provided that the apparatus is to be used only for end milling operations. Besides, the arrangement according to the invention may be designed to enable a movement of the optical axis of the microscope 22 to different positions so that the three-dimensional positions of the other axes may be changed too, without departing from the invention. Finally, two or more light sources, with or without converging lenses arranged before them, may be used for special purposes.

It may occur to others of ordinary skill in the art to make modifications of the present invention which will lie within its concept and scope and not constitute a departure. Accordingly, it is intended that the invention be not limited by the details of its description but only by the following claims.

What is claimed is:

1. A trimming apparatus for trimming microtome specimens including:

a frame, arm means being mounted for rotation relative to said frame about a Z axis, spindle means being mounted for rotation relative to said arm about an X axis, specimen holder means being mounted for rotation relative to said spindle about a Y axis, said X, Y, and Z axes being mutually perpendicular, a cutter being mounted on shaft means and rotatable about the axis thereof, means for positioning said shaft means relative to said frame for selective translation in axial and transverse directions, whereby said shaft means is positionable adjacent said specimen holder, an optical alignment system including an illumination system disposed along an illumination axis and a viewing system disposed along a viewing axis for alignment of the specimen relative to the cutter, said X, Y, Z, illumination, viewing, and spindle means axes intersecting at a common point when said specimen and cutter are in operative relationship.

2. A trimming apparatus as defined in claim 1 further including an arcuate segment fixedly mounted on said spindle means, the center of curvature of said arcuate segment being said Y axis, said specimen holder being mounted relative to said spindle means on said arcuate segment.

References Cited

UNITED STATES PATENTS

| | | | |
|---|---|---|---|
| 1,414,970 | 5/1922 | Nelson | 269—71 X |
| 3,082,581 | 3/1963 | Vadeboncoeur | 51—165 (.40) |
| 3,117,492 | 1/1964 | Muller | 90—14 X |
| 3,308,704 | 3/1967 | Burkhardt | 83—915.5 X |
| 3,371,580 | 3/1968 | Barnes et al. | 90—15 X |
| 3,428,305 | 2/1969 | Bohn | 269—75 |

GIL WEIDENFELD, Primary Examiner

U.S. Cl. X.R.

51—216 R; 90—14; 269—75